United States Patent
Rice et al.

(10) Patent No.: US 7,359,500 B2
(45) Date of Patent: Apr. 15, 2008

(54) METHOD FOR CARRYING OUT PREDETERMINED ACTIONS BY A RECEIVING TELECOM DEVICE USING AN ANSWER PREFIX

(75) Inventors: Steven A. Rice, Shelbyville, KY (US); Douglas L. Robertson, Lexington, KY (US)

(73) Assignee: Lexmark International Inc., Lexington, KY (US)

( * ) Notice: Subject to any disclaimer, the term of this patent is extended or adjusted under 35 U.S.C. 154(b) by 89 days.

(21) Appl. No.: 10/794,215

(22) Filed: Mar. 5, 2004

(65) Prior Publication Data

US 2005/0195953 A1   Sep. 8, 2005

(51) Int. Cl.
  *H04M 3/42* (2006.01)
(52) U.S. Cl. .............................. 379/215.01; 379/201.01
(58) Field of Classification Search ........... 379/215.01, 379/201.01, 93.01, 194, 195, 201.03
See application file for complete search history.

(56) References Cited

U.S. PATENT DOCUMENTS

| | | | |
|---|---|---|---|
| 4,054,756 A | 10/1977 | Comella et al. | |
| 4,805,210 A * | 2/1989 | Griffith, Jr. ................. | 379/195 |
| 5,199,062 A | 3/1993 | Von Meister et al. | |
| 5,337,350 A | 8/1994 | Kuwahara | |
| 5,490,210 A * | 2/1996 | Sasso ..................... | 379/100.15 |
| 5,493,609 A | 2/1996 | Winseck, Jr. et al. | |
| 5,544,229 A * | 8/1996 | Creswell et al. ....... | 379/114.05 |
| 5,546,451 A * | 8/1996 | Shen ..................... | 379/215.01 |
| 5,566,235 A | 10/1996 | Hetz | |
| 5,581,369 A * | 12/1996 | Righter et al. .............. | 358/442 |
| 5,604,796 A * | 2/1997 | Yamazaki .............. | 379/215.01 |
| 5,790,652 A * | 8/1998 | Gulley et al. ............... | 379/368 |
| 5,844,967 A | 12/1998 | Lee | |
| 5,862,474 A * | 1/1999 | Kimball ...................... | 455/418 |
| 6,021,190 A | 2/2000 | Fuller et al. | |
| 6,055,305 A | 4/2000 | Norman et al. | |
| 6,067,353 A * | 5/2000 | Szeliga .................... | 379/93.35 |
| 6,104,797 A | 8/2000 | Nabkel et al. | |
| 6,160,877 A | 12/2000 | Tatchell et al. | |
| 6,269,248 B1 * | 7/2001 | Jayawardene ............... | 455/465 |
| 6,463,132 B1 | 10/2002 | Yoshida et al. | |
| 6,487,278 B1 | 11/2002 | Skladman et al. | |
| 6,496,283 B1 * | 12/2002 | Kabeya ...................... | 358/468 |
| 6,574,322 B1 | 6/2003 | Larsson | |
| 6,628,771 B1 * | 9/2003 | Frise et al. ............ | 379/215.01 |
| 6,650,746 B1 | 11/2003 | Groen et al. | |
| 6,671,356 B2 | 12/2003 | Lewis | |
| 6,671,364 B2 | 12/2003 | Rosera et al. | |
| 6,678,528 B2 | 1/2004 | Clark | |
| 6,744,860 B1 * | 6/2004 | Schrage ................... | 379/88.03 |

(Continued)

FOREIGN PATENT DOCUMENTS

GB   2 303 272   * 12/1997

*Primary Examiner*—William J. Deane, Jr.
(74) *Attorney, Agent, or Firm*—Thompson Hine LLP

(57) ABSTRACT

A method for carrying out predetermined actions by a telecom receiving device. A predetermined answer string is entered and stored in a memory portion of a receiving telecom device. Incoming calls are checked for appropriateness. Accepted incoming calls are monitored for a predetermined event. If the predetermined event is detected, a set of steps are accomplished in accordance with the previously stored answer string. The receiving telecom device then resumes normal operation after completing the actions represented by the answer string.

42 Claims, 3 Drawing Sheets

U.S. PATENT DOCUMENTS

| | | |
|---|---|---|
| 6,839,420 B1 * | 1/2005 | Koponen .................... 379/219 |
| 2002/0021796 A1 | 2/2002 | Schessel |
| 2002/0064272 A1 * | 5/2002 | Naghi et al. |
| 2002/0075847 A1 | 6/2002 | Thomas et al. |
| 2003/0007621 A1 | 1/2003 | Graves et al. |
| 2003/0012348 A1 | 1/2003 | Skladman et al. |
| 2003/0021264 A1 | 1/2003 | Zhakov et al. |
| 2003/0023759 A1 * | 1/2003 | Littleton et al. |
| 2003/0026393 A1 | 2/2003 | Skladman et al. |
| 2003/0108174 A1 | 6/2003 | Tucker et al. |

* cited by examiner

METHOD FOR CARRYING OUT PREDETERMINED ACTIONS BY A RECEIVING TELECOM DEVICE USING AN ANSWER PREFIX

CROSS REFERENCE TO RELATED APPLICATIONS

This application claims the benefit of U.S. application Ser. No. 10/328,903, filed Dec. 24, 2002 and incorporated herein by reference.

FIELD

The present invention relates generally to devices attached to a telephone network and, more particularly, to receiving telecom devices capable of performing one or more predetermined tasks upon the trigger of some event.

BACKGROUND

A telephone typically comprises a plurality of input keys, a handset for transmitting and receiving voice information, and a cradle for holding the handset. A "hook switch" located proximate the cradle changes its electrical state when the handset is placed into or removed from the cradle, providing an indication to the telephone network as to whether the telephone is "on hook" (i.e., in a standby mode) or "off-hook" (i.e., in an active or in-use mode). Equipment that utilizes a telephone network for non-voice communications, such as facsimile machines and computers, provide equivalent on- and off-hook electrical signals that enable the telephone network to determine whether or not the telephone line connected to the equipment is in use.

The public and private telephone networks to which the telephone is connected provide real-time information paths between two or more parties. The public system is generally referred to as the Public Switched Telephone Network ("PSTN"), while private systems, such as a telephone network within a business, are generally referred to as a Private Branch Exchange ("PBX"). Traditionally, these public and private information paths have taken the form of voice connections, originally through hardwired analog circuitry but later through an increasingly broad range of technologies such as radio transmission, digital signal encoding, and fiber optics. Over time, these information paths have also begun to be used for non-voice applications such as fax and data transmission and reception.

Modern telephones and telephone networks provide a variety of calling features, such as call waiting, call hold, call pick-up, call transfer, conference calls, call forwarding, call redirection, automatic call-back, and speed dialing. These features are typically manually enabled or disabled by a user, who enters a series or "string" of command inputs via the input keys, sometimes beginning with a "flash" input. A flash input is executed by momentarily depressing the telephone's hook switch to place the phone on-hook, then releasing the hook switch. Many telephones have a separate flash key to accomplish the flashing function. An example command string is effective to disable the call-waiting feature by inputting "flash," "*," "7" and "0." Equipment that utilizes a telephone network may likewise be adapted to generate command string inputs under the control of a user.

Many electronic printing devices utilize telephone networks to send and receive non-voice data. One such device is an all-in-one ("AIO") device. An AIO device is a multi-function device that may function, for example, as a printer, scanner and copier. Such AIO devices may also function as a facsimile or "fax" machine when connected to a conventional telephone line. AIO devices generally cost less, take up less space, and use less energy than separate printers, scanners, copiers and fax machines. Further, AIO devices are often able to multitask between functions, increasing the user's productivity. Since an AIO device provides a plurality of functions in a single unit, connecting the AIO device to other equipment, such as computers, is greatly simplified as compared to wiring separate, single-function units. AIO devices are often networked to allow multiple users to access a single device.

There are times when it is desirable to enable or disable certain calling features when a non-voice communication device is connected to a telephone line. For example, a telephone network's call waiting feature may preferably be disabled during the transmission or reception of a fax message because the call waiting tone that notifies a user of an incoming call may interfere with the transmission or reception of the fax. Thus, there exists a need for a receiving device connected to a telephone line that is able to perform a set of predetermined tasks, such as enabling, disabling, initiating and halting a calling feature, in response to some predetermined event, such as an incoming call having predetermined characteristics.

SUMMARY

The present invention provides a receiving telecom device, which may be an AIO, adapted to perform a sequence of steps that are defined by a predetermined answer string. The sequence of events may be initiated by the occurrence of some predetermined event. The method begins with a user entering and storing a predetermined answer string in a memory portion of a receiving telecom device. Incoming calls are then checked for appropriateness. Accepted incoming calls are monitored for a predetermined event, such as a tone or audio signal that is at least one of a predetermined pattern, frequency and duration. If the predetermined event is detected, a predetermined set of steps are accomplished in accordance with the previously stored answer string. In a preferred embodiment, signals representing the previously stored answer string are transmitted over the telephone line to the telephone network, the signals being effective to accomplish at least one of enabling, disabling, initiating and halting a calling feature. The receiving telecom device then resumes normal operation after completing the actions represented by the answer string.

An object of the present invention is a method for carrying out predetermined actions by a receiving telecom device. At least one answer string, comprising at least one character is entered and stored in a memory portion of the receiving telecom device. A telephone line is monitored for an incoming call. Incoming calls that meet predetermined appropriateness criteria are accepted and a line interface unit is signaled to go off-hook. The telephone line is monitored for the occurrence of at least one predetermined event. Events that meet predetermined criteria are accepted. After a sequence of command steps are completed in accordance with the answer string stored in the memory portion, a predetermined mode of operation is resumed, wherein the sequence of command steps are effective to accomplish at least one of the functions of disabling, enabling, initiating or halting a calling feature.

Another object of the present invention is a method for carrying out predetermined actions by a receiving telecom device. At least one answer string, comprising a plurality of characters, is entered and stored in a memory portion. A telephone line is monitored for an incoming call. Incoming calls that meet predetermined appropriateness criteria comprising a facsimile CNG signal are accepted. A line interface unit is signaled to go off-hook. The telephone line is monitored for the occurrence of at least one predetermined event, comprising a facsimile CNG signal. Events that meet predetermined criteria are accepted. A sequence of command steps are completed in accordance with the answer string stored in the memory portion. A predetermined mode of operation is then resumed, wherein the answer string is effective to disable a call waiting telephone feature.

Yet another object of the present invention is a receiving telecom device comprising a memory device, a data entry device for entering at least one answer string, the answer string including at least one character, in a memory portion, and a line interface unit for monitoring a telephone line for an incoming call. The receiving telecom device is programmed to actuate the line interface unit to accept incoming calls that meet predetermined appropriateness criteria by signaling the line interface unit to go off-hook, monitor the telephone line for the occurrence of at least one predetermined event and accept events that meet predetermined criteria and complete a sequence of command steps in accordance with the answer string stored in the memory portion; wherein the sequence of command steps is effective to accomplish at least one of disabling, enabling, initiating and halting a calling feature.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
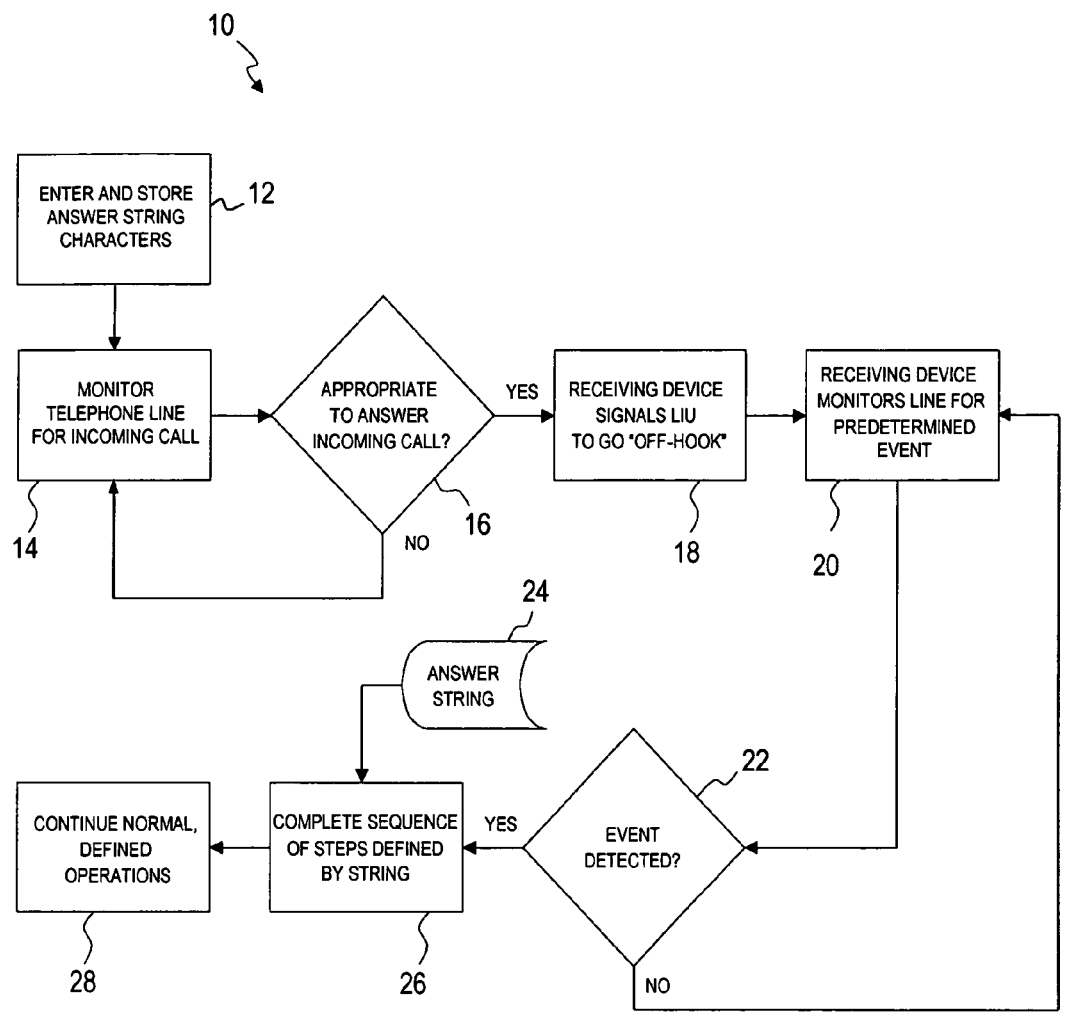
FIG. 1 is a flowchart showing a method for carrying out predetermined actions by a receiving telecom device according to an embodiment of the present invention.

A method, generally designated 10, of the present invention for carrying out predetermined actions by a receiving telecom device 40 (see FIG. 3) is shown in the flowchart of FIG. 1. As used herein, the term "receiving telecom device" is not intended to exclude devices having telecom transmission capability. Rather, the term encompasses telecom devices adapted to respond to incoming telephonic calls by executing a command string, as contrasted with executing a command string as part of an outgoing call from the telecom device, and therefore would include such devices as facsimile machines, modems and AIO's.

The method 10 preferably is performed by a receiving telecom device 40 having programmable memory 24, preferably flash memory, and a line interface unit ("LIU") 44. The memory 24 may store commands that actuate the receiving telecom device 40 to perform the method 10 of the invention as well as answer string characters that govern how the receiving telecom device will respond to incoming call signals. The LIU 44 is connected by a conventional telephone line 46 to a telephone network 48. The receiving telecom device 40 preferably includes a data entry device for entering an answer string characters. Such data entry devices may include a keypad 50, preferably integral with the receiving telecom device, or a personal computer 52.

The method begins at block 12, where a predetermined set of "answer string" characters is entered by a user by way of a data entry device into the receiving telecom device 40. The answer string characters may be stored in memory 24 of the receiving device 40. The answer string characters may include any combination of digits 0-9, a "star" (*) key, a "pound" (#) key, and special action characters. The answer string characters are selected and arranged to correspond to predetermined tasks, such as at least one of enabling, disabling, initiating and halting at least one calling feature. Special action characters used in the answer string may represent some predetermined task, or action, that is inserted into the sequence of events defined by the answer string.

Telephone line 46 is monitored by LIU 44 at block 14 by the receiving telecom device. Incoming calls are checked by LIU 44 at block 16 for appropriateness in accordance with predetermined criteria. Such appropriateness criteria may include, without limitation, a voice signal, any combination of a predetermined pattern or number of telephone ring signals, and telephone ring signals of varying frequency and duration. Similarly, the receiving device 40 may go off-hook and check for predetermined appropriateness criteria, such as audible signals or tones having any combination of a predetermined pattern, frequency and duration.

Incoming calls satisfying the predetermined appropriateness criteria are accepted at block 16 and the receiving device 40 actuates LIU 44 to go off-hook at block 18. The receiving device 40 then monitors the phone line 46 at block 20 for a predetermined event or series of events. Example events may include, but are not limited to, a voice signal and audible signals and tones having at least one of a predetermined pattern, frequency and duration.

When a predetermined event is detected by LIU 44 at block 22, method 10 actuates the receiving telecom device 40 to carry out at block 26 a predetermined sequence of command steps in accordance with the answer string entered at block 12 and stored in memory portion 24. The sequence of command steps preferably comprises transmitting to the telephone network 48 a series of signals that are equivalent to the predetermined answer string and are in a form recognizable by the telephone network 48. The answer string is received by the telephone network 48, causing at least one of enabling, disabling, initiating and halting at least one calling feature associated with the answer string.

When the sequence of command steps of block 26 is completed, method 10 actuates the receiving telecom device 40 to resume normal operation at block 28. If the receiving telecom device 40 is an AIO, method 10 would actuate the AIO to perform an operations such as printing, copying, faxing and scanning tasks.

Figure 2:
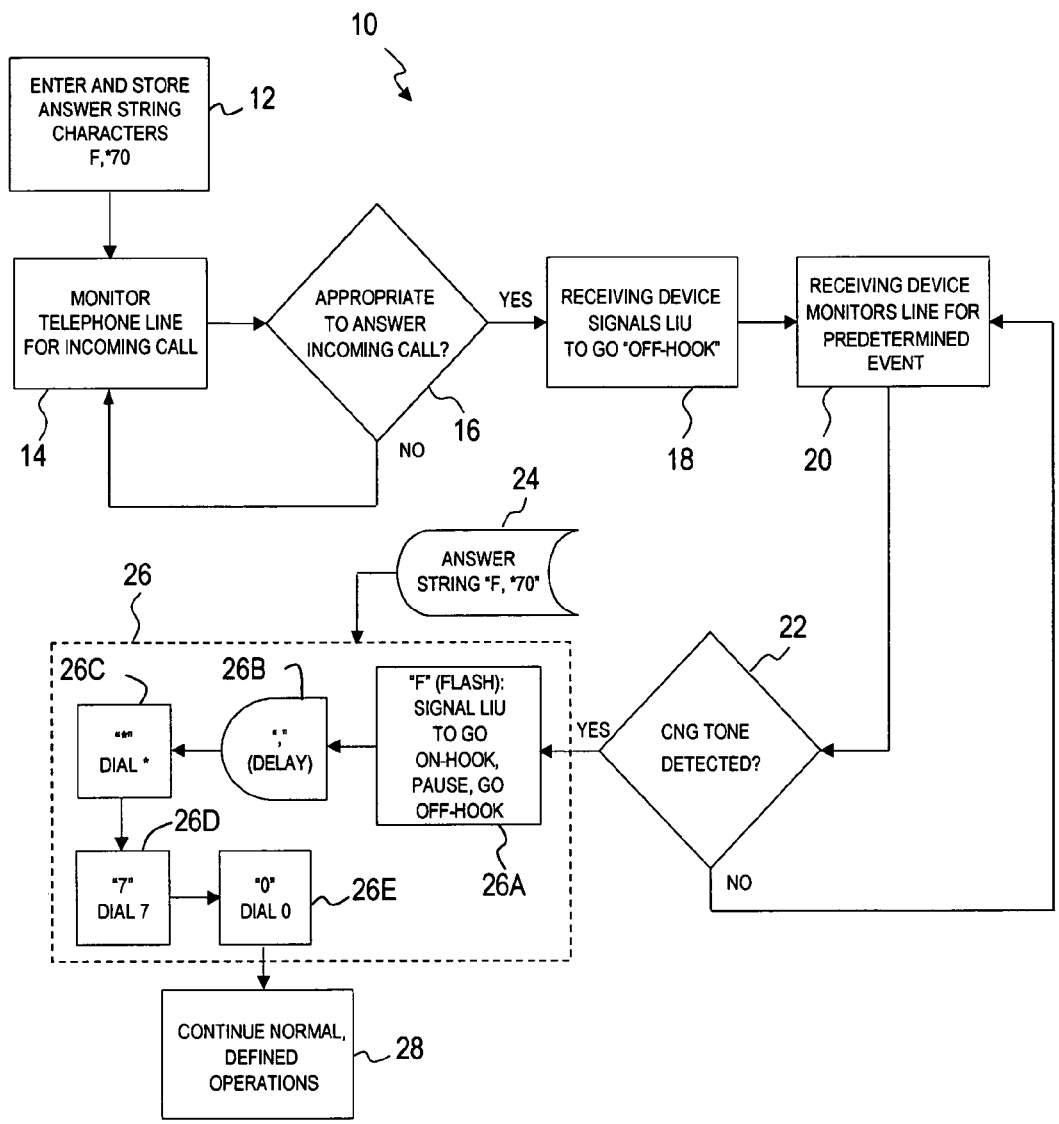
FIG. 2 is an example embodiment of the method of FIG. 1.
Figure 3:
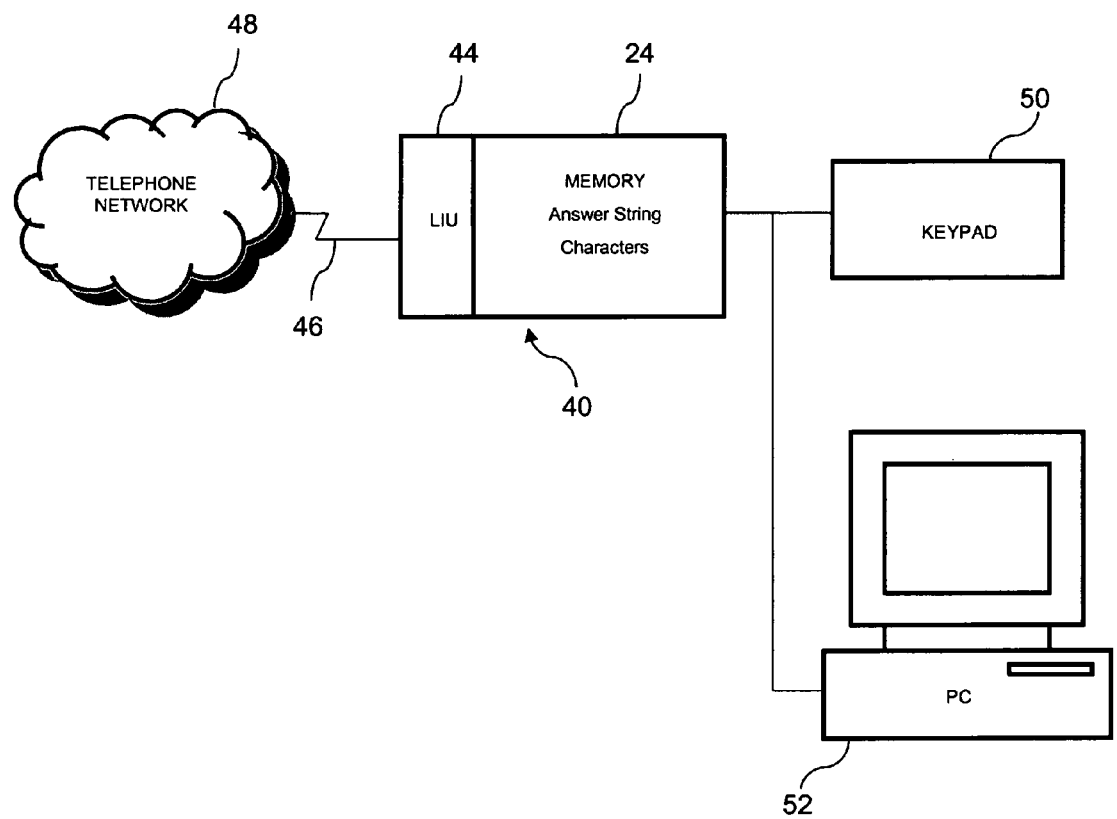
FIG. 3 is a schematic diagram of the receiving telecom device of the present invention connected to a telephone network.

An example embodiment of method 10 is shown in FIG. 2. At block 12 a predetermined set of answer string characters is entered by a user, for example by way of keypad 50, into memory 24 of a receiving telecom device 40 (FIG. 3). In this example, an answer string comprising "flash," "[comma]," "*" and "70" is entered and stored in memory portion 24.

Telephone line 46 is monitored by LIU 44 of the device 40 at block 14. Incoming calls are checked by LIU 44 at block 16 for appropriateness in accordance with predetermined criteria. Such appropriateness criteria may include, without limitation, any combination of a voice signal, any combination of a predetermined pattern or number of telephone ring signals, and telephone ring signals of varying frequency and duration. Similarly, the receiving device 40 may go off-hook and check for predetermined appropriateness criteria, such as audible signals or tones having any combination of a predetermined pattern, frequency and duration.

Incoming calls satisfying the predetermined appropriateness criteria are accepted at block 16, and the receiving device 40 actuates LIU 44, which couples the receiving unit to the phone line 46, to go off-hook at block 18. The receiving device 40 then monitors the phone line 46 at block 20 for a predetermined event or series of events. In this example, a conventional facsimile calling tone ("CNG") of about 1100 Hz serves as the predetermined event of block 20. When the CNG tone is detected at block 22, method 10 actuates receiving device 40 to carry out at block 26 a predetermined sequence of events in accordance with the answer string entered at block 12 and stored in memory portion 24. In this example, answer string "flash," "[comma]," "*" and "70" is executed at command blocks 26A, 26B, 26C, 26D and 26E by transmitting electrical signals equivalent to these characters over the telephone line 46 to the telephone network 48 in a form that is recognizable by the telephone network. The answer string is received by the network 48, causing disabling of the call waiting feature of the network. Disabling of the call waiting feature is preferred during the reception of facsimile data, as the conventional tone used to alert a listener of a waiting call can interfere with the reception of a facsimile message in progress.

When the sequence of command steps of block 26 is completed, method 10 actuates the receiving device 40 to resume normal operation at block 28. In the example of FIG. 2, the AIO device will proceed to receive an incoming facsimile message.

With reference again to FIG. 1, in an alternate embodiment of the present invention, at block 12 an answer string corresponding to a call redirection feature may be entered, for example by keypad 50, and stored in memory 24 of the receiving telecom device 40. The redirection feature may be adapted to direct an incoming fax call from, for example, a voice telecom device to a fax telecom device. At block 14 the telephone line 46 is monitored for an incoming call. Upon receipt of an incoming call, the call is checked by LIU 44 for appropriateness at block 16. If in this embodiment the receiving telecom device 40 is a telephone and the incoming call is a fax transmission, the call may be accepted at block 16. The LIU 44 is actuated to go off-hook at block 18, and at block 20 the receiving telecom device 40 monitors the telephone line 46 for a predetermined event, such as a CNG tone. Upon detection of the CNG tone by LIU 44 at block 22, the predetermined answer string entered at block 12 and stored in memory portion 24 is executed to redirect the incoming fax call from the voice telephone 40 to, for example, a separate fax machine (not shown) or a fax modem in the personal computer 52.

With reference again to FIG. 1, one skilled in the art will recognize that the present invention may be adapted to meet a variety of needs for a particular receiving telecom device and/or a particular installation of a receiving telecom device. For example, the appropriateness check of block 16 may be adapted to accept, without limitation, any combination of a predetermined pattern or number of telephone ring signals and telephone ring signals of varying frequency and duration. Similarly, the receiving telecom device may go off-hook and check for predetermined appropriateness criteria, such as audible signals or tones having any combination of a predetermined particular pattern, frequency and duration. Thus, a receiving telecom device may be adapted to discriminate incoming calls and accept only calls intended for that particular receiving telecom device, allowing for installations of multiple receiving telecom devices on a common telephone line.

With continued reference to FIG. 1, one skilled in the art will also recognize that entry of an answer string at block 12 storage of the answer string in memory portion 24 allows a wide variety of answer strings to created and stored. While an example directed to disabling call waiting has been described, it can be seen that any present or future calling feature of a telephone network may be enabled, disabled, initiated, or halted by means of appropriate predetermined answer strings compatible with the calling feature.

Further, a plurality of answer strings may be stored in memory 24. Each answer string may be associated with at least one predetermined event, such that step 20 of method 10 may monitor for a plurality of events. When an event conforming to predetermined criteria for at least one event is detected at block 22, at least one sequence of command steps may be carried out at block 26 in accordance with at least one answer string stored in memory 24.

While this invention has been shown and described with respect to a detailed embodiment thereof, it will be understood by those skilled in the art that various changes in form and detail thereof may be made without departing from the scope of the claims of the invention.

What is claimed is:

1. A method for carrying out predetermined actions by a receiving telecom device, comprising the steps of:
providing a data entry device integral with the receiving telecom device;
selectively entering and storing by a user by way of the data entry device a first answer string associated with at least a first predetermined event, the first answer string having at least one character, in a programmable and non-volatile memory portion of the receiving telecom device;
monitoring a telephone line for an incoming call;
accepting incoming calls that meet predetermined appropriateness criteria;
signaling a line interface unit to go off-hook;
monitoring the off-hook telephone line for the occurrence of at least one predetermined event;
accepting events that meet predetermined event criteria;
if accepting the first predetermined event, completing a sequence of command steps in accordance with the first answer string stored in the memory portion; and
resuming a predetermined mode of operation, wherein the sequence of command steps is effective to accomplish at least one of disabling, enabling, initiating and halting a calling feature.

2. The method of claim 1 wherein the first answer string has a plurality of characters.

3. The method of claim 1 wherein the first answer string is effective to disable a call waiting telephone feature and the predetermined event is a facsimile CNG signal.

4. The method of claim 1 wherein the first answer string is effective to redirect an incoming facsimile call from a voice telephone to a facsimile machine and the predetermined event is a facsimile CNG signal.

5. The method of claim 1 wherein the memory portion comprises a plurality of answer strings, each answer string being associated with at least one predetermined event.

6. The method of claim 1 wherein the appropriateness criteria comprises at least one ring signal having at least one of a predetermined number of rings, ring pattern, ring frequency and ring duration.

7. The method of claim 1 wherein the appropriateness criteria comprises at least one signal having at least one of a predetermined pattern, frequency and duration.

8. The method of claim 1 wherein the appropriateness criteria is a voice signal.

9. The method of claim 1 wherein the predetermined event is at least one signal having at least one of a predetermined pattern, frequency and duration.

10. The method of claim 1 wherein the predetermined event is a plurality of events.

11. The method of claim 1 wherein the predetermined event is a voice signal.

12. The method of claim 1 wherein the receiving telecom device is an AIO device.

13. A method for carrying out predetermined actions by a receiving telecom device, comprising the steps of:
   providing a data entry device integral with the receiving telecom device;
   selectively entering and storing by a user by way of the data entry device a first answer string, comprising a plurality of characters, in a programmable and non-volatile memory portion of the receiving telecom device;
   monitoring a telephone line for an incoming call;
   accepting incoming calls that meet predetermined appropriateness criteria signaling a facsimile transmission;
   signaling a line interface unit to go off-hook;
   monitoring the off-hook telephone line for the occurrence of at least one predetermined event comprising a facsimile CNG signal;
   accepting events that meet predetermined event criteria associated with a facsimile CNG signal;
   completing a sequence of command steps in accordance with the first answer string stored in the memory portion; and
   resuming a predetermined mode of operation wherein the answer string is effective to selectively disable a call waiting telephone feature during the reception of a facsimile transmission.

14. The method of claim 1 further comprising:
   a second answer string associated with at least a second predetermined event, the second answer string having at least one character; and
   if accepting the second predetermined event, completing a sequence of command steps in accordance with the second answer string stored in the memory portion.

15. The method of claim 14 wherein the second answer string may be selectively entered and stored by the user of the receiving telecom device in the memory portion such that the second answer string replaces the first answer string.

16. The method of claim 14 wherein the second answer string may be selectively entered and stored by the user of the receiving telecom device in the memory portion such that the first answer string remains in the memory portion.

17. The method of claim 14 wherein the second answer string has a plurality of characters.

18. The method of claim 14 wherein the second answer string is effective to disable a call waiting telephone feature and the predetermined event is a facsimile CNG signal.

19. The method of claim 14 wherein the second answer string is effective to redirect an incoming facsimile call from a voice telephone to a facsimile machine and the predetermined event is a facsimile CNG signal.

20. A receiving telecom device comprising:
   a programmable and non-volatile memory device;
   a data entry device integral with the receiving telecom device that enables a user of the receiving telecom device to selectively enter and store a first answer string associated with at least a first predetermined event, the answer string including at least one character, in a memory portion of the memory device;
   a line interface unit for monitoring a telephone line for an incoming call;
   the receiving telecom device being programmed to actuate the line interface unit to accept incoming calls that meet a predetermined appropriateness criteria by signaling the line interface unit to go off-hook, monitor the off-hook telephone line for the occurrence of at least one predetermined event, accept events that meet predetermined event criteria, and if accepting the first predetermined event, complete a sequence of command steps in accordance with the first answer string stored in the memory portion; wherein the sequence of command steps is effective to accomplish at least one of disabling, enabling, initiating and halting a calling feature.

21. The receiving telecom device of claim 20 wherein the device is programmed to resume a predetermined mode of operation once the sequence of command steps is completed.

22. The device of claim 20 wherein the first answer string includes a plurality of characters.

23. The device of claim 20 wherein the first answer string is effective to disable a call waiting telephone feature and the predetermined event is a facsimile CNG signal.

24. The device of claim 20 wherein the first answer string is effective to redirect an incoming facsimile call from a voice telephone to a facsimile machine and the predetermined event is a facsimile CNG signal.

25. The device of claim 20 wherein the memory device includes a plurality of answer strings, each answer string being associated with at least one predetermined event.

26. The device of claim 20 wherein the appropriateness criteria includes at least one ring signal having at least one of a predetermined number of rings, ring pattern, ring frequency and ring duration.

27. The device of claim 20 wherein the appropriateness criteria includes at least one signal having at least one of a predetermined pattern, frequency and duration.

28. The device of claim 20 wherein the appropriateness criteria is a voice signal.

29. The device of claim 20 wherein the predetermined event is at least one signal having at least one of a predetermined pattern, frequency and duration.

30. The device of claim 20 wherein the predetermined event is a plurality of events.

31. The device of claim 20 wherein the predetermined event is a voice signal.

32. The device of claim 20 wherein the receiving telecom device is an AIO device.

33. The device of claim 20 wherein the data entry device is a keypad.

34. The device of claim 20 wherein the data entry device is a personal computer.

35. The method of claim 13 further comprising:
   a second answer string associated with at least a second predetermined event, the answer string having at least one character; and if accepting the second predetermined event, completing a sequence of command steps in accordance with the second answer string stored in the memory portion.

36. The method of claim 35 wherein the second answer string may be selectively entered and stored in the memory portion such that the second answer string replaces the first answer string.

37. The method of claim 35 wherein the second answer string may be selectively entered and stored in the memory portion such that the first answer string remains in the memory portion.

38. The method of claim 35 wherein the second answer string has a plurality of characters.

39. The method of claim 35 wherein the second answer string is effective to disable a call waiting telephone feature and the predetermined event is a facsimile CNG signal.

40. The method of claim 35 wherein the second answer string is effective to redirect an incoming facsimile call from a voice telephone to a facsimile machine and the predetermined event is a facsimile CNG signal.

41. A receiving telecom device comprising:
a programmable and non-volatile memory;
a data entry device integral with the receiving telecom device that enables a user of the receiving telecom device to selectively enter and store a first answer string, comprising a plurality of characters, in the memory;
a line interface unit that is actuated by the receiving telecom device to (i) monitor a telephone line for an incoming call, (ii) accept incoming calls that meet predetermined appropriateness criteria, (iii) signal a line interface unit to go off-hook, (iv) monitor the off-hook telephone line for the occurrence of at least one predetermined event comprising a facsimile CNG signal, (v) accept events that meet predetermined event criteria, (vi) complete a sequence of command steps in accordance with the first answer string stored in the memory portion, and (vii) resume a predetermined mode of operation;
wherein the answer string is effective to disable, enable, initiate or halt a call feature.

42. The receiving telecom device of claim 41 wherein the appropriateness criteria is selected from the group comprising a predetermined number of rings, a ring pattern, a ring frequency, ring duration, and a combination of two or more of the foregoing.

* * * * *